Dec. 13, 1960   R. W. PHILBRICK   2,963,949
CAMERAS FOR MAKING AERIAL SURVEY PHOTOGRAPHS
Filed Sept. 4, 1957   2 Sheets-Sheet 1
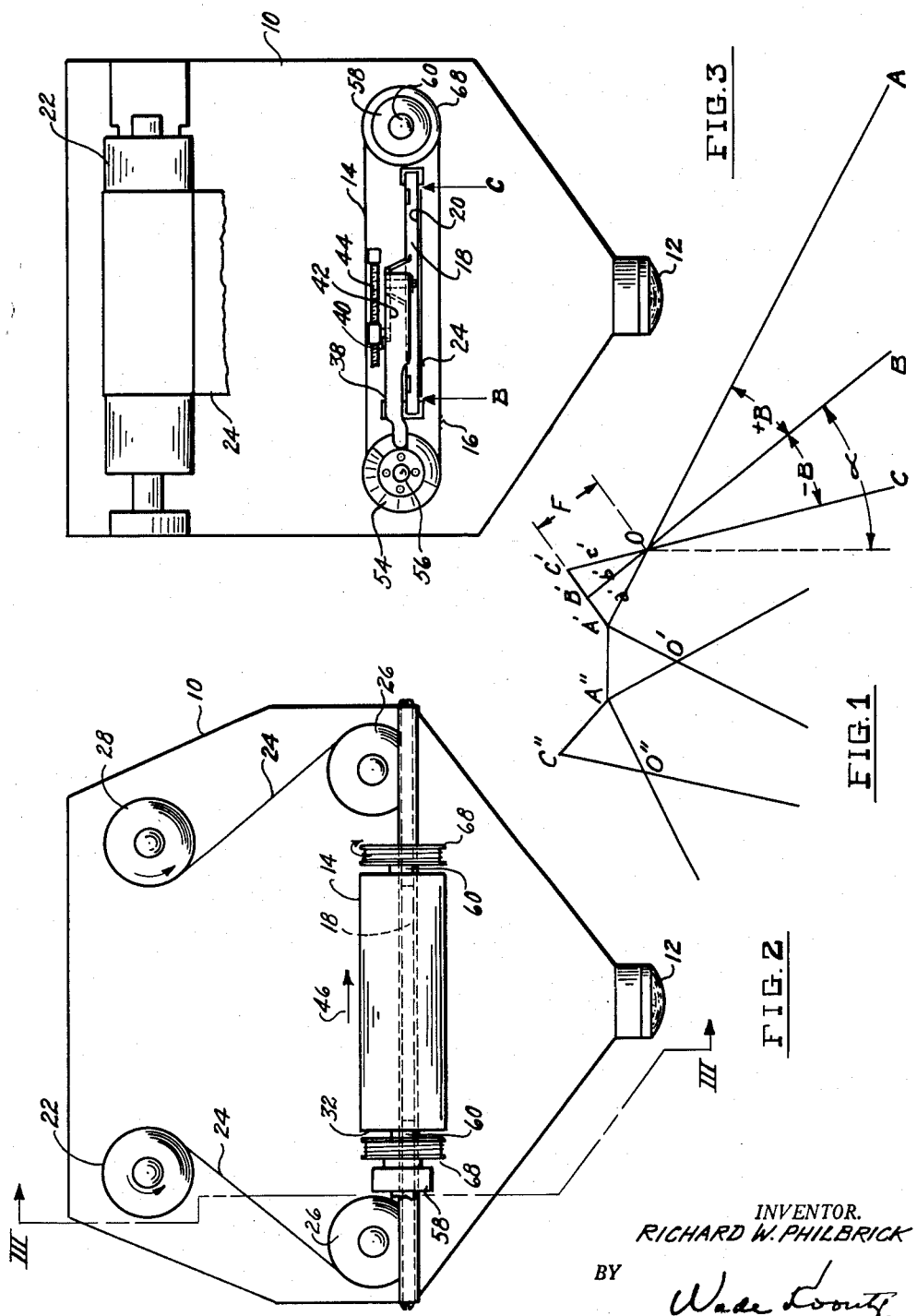
INVENTOR.
RICHARD W. PHILBRICK
BY
ATTORNEYS Dec. 13, 1960 R. W. PHILBRICK 2,963,949
CAMERAS FOR MAKING AERIAL SURVEY PHOTOGRAPHS
Filed Sept. 4, 1957 2 Sheets-Sheet 2

INVENTOR.
RICHARD W. PHILBRICK
BY
ATTORNEYS

United States Patent Office 2,963,949
Patented Dec. 13, 1960

2,963,949

CAMERAS FOR MAKING AERIAL SURVEY PHOTOGRAPHS

Richard W. Philbrick, 16 Elm St., Concord, Mass.

Filed Sept. 4, 1957, Ser. No. 682,069

9 Claims. (Cl. 95—12.5)

(Granted under Title 35, U.S. Code (1952), sec. 266)

The invention described herein may be manufactured and used by or for the United States Government for governmental purposes without payment to me of any royalty thereon.

The present invention relates to improvements aerial photography and, as illustrated herein, relates more particularly to improvements in aerial cameras designed to overcome inherent differential movement of the photographic images on the focal plane of a camera having its lens axis inclined at an angle to the vertical.

The use of a triple camera arrangement with the photographic axes of all three cameras extending in a substantially vertical plane perpendicular to the direction of travel of the survey aircraft is usual in performing military surveillance.

The central or intermediate camera has its photographic axis substantially vertical with reference to the ground and the problem of differential image travel across its focal plane is not serious. However, the other two cameras are disposed with their optical axes at an acute angle to the general plane of the ground and under such conditions differential image travel across the focal plane of the inclined cameras is sufficiently great to prevent the production of sharp pictures unless such differential image travel is accurately compensated for.

In order to provide sharp images on the focal plane of each of the cameras, it is known to reciprocate the film platen or support with the film thereon axially to the direction of flight of the aircraft. The rate of movement of the film platen or support is so adjusted in proportion to the altitude and speed of the aircraft that the film will be moving forwardly at the same rate of speed as the terrain images are moving forwardly on the film which is located in the focal plane of the camera. The photographic exposure of the film is made during forward movement of the platen and then the film is released from the platen and moved quickly to bring the next successive portion of unexposed film into photographing position. During this film transporting movement, the platen is returned to its original position while the shutter is closed. The film is then again secured to the platen by suction and the focal plane shutter then moves across the film as the platen with the film thereon moves forwardly as the film is exposed.

When the camera is laterally inclined, the images of the objects lying nearer to the horizon move across the focal plane of the camera from rear to front at a rate of speed which is substantially less than the rate of speed of the images of objects on the ground located more nearly directly under the survey aircraft. Under such conditions heretofore it has not been possible to avoid a blurring of either the foreground or the background of the image. However, I have found it possible to greatly minimize this blurring. In order to accomplish this the rate of platen advance must vary from the predetermined minimum when exposures of images near the horizon are being made to a maximum when exposures of ground images more nearly under the aircraft are being made. These values may readily be determined mathematically and provision for variation in image velocity across the film in the focal plane may be accurately calculated.

One object of the present invention is to provide a construction wherein the rate of movement of a film supporting platen may be varied depending upon the inclination of the focal plane of the camera, the ground velocity or said speed of the aircraft and the altitude of the aircraft above the terrain to be photographed in accordance with the rate of movement of the image of the terrain objects on the focal plane. To this end, one feature of the invention resides in an aerial survey camera having means for relating the movement of a film supporting platen to the movement of the focal plane shutter cross the film in accordance with the rate of image travel across the focal plane of the camera. As illustrated, the shutter operating mechanism is provided with cam means for controlling the rate of platen movement in accordance with the precise position of the exposing slit of the focal plane shutter as it moves over the film on the moving platen.

Another object of the present invention is to provide an improved method of exposing film in aerial survey cameras wherein there is a substantial difference in rate of image movement across the focal plane of the camera. In accordance with this object, one feature of the present invention resides in an improved method of making aerial survey photographs which comprises the steps of moving a focal plane shutter having an exposure slit therein across a photosensitive film fixed to a film supporting platen and moving the platen in the direction of image movement across the focal plane and varying the rate of movement of said platen as the slit in said focal plane shutter moves across said photo-sensitive film. As illustrated herein, the focal plane of the aerial survey camera is inclined with respect to the general horizontal plane of the terrain below and consequently the rate of movement of an image of a background object across the focal plane of the camera is at a minimum but the rate of movement of the images nearer the foreground is greater. It will be clear that as we explore the varying image motion across the focal plane from background to foreground we find a steady increase in image motion reaching a maximum in the foreground area. The rate of increase of movement, however, is dependent upon the inclination of the focal plane of the camera to the general plane of the terrain below. The rate of increase of the varying image motion across the focal plane can be accordingly calculated for any angle of inclination.

Other objects of the invention are to improve generally upon the construction of aerial survey cameras and methods of making aerial survey photographs.

With the above and other objects in view, the invention will now be described with particular reference to the accompanying drawings which illustrate a preferred embodiment of the present invention and in which:

Fig. 1 is a schematic vertical view through the photographic or optical axes of the cameras in a vertical plane extending at right angles to the direction of flight of the aerial survey aircraft;

Fig. 2 is a vertical schematic view of a camera of a type in which the present invention is embodied;

Fig. 3 is a view taken along the line III—III of Fig. 2;

Figure 4:
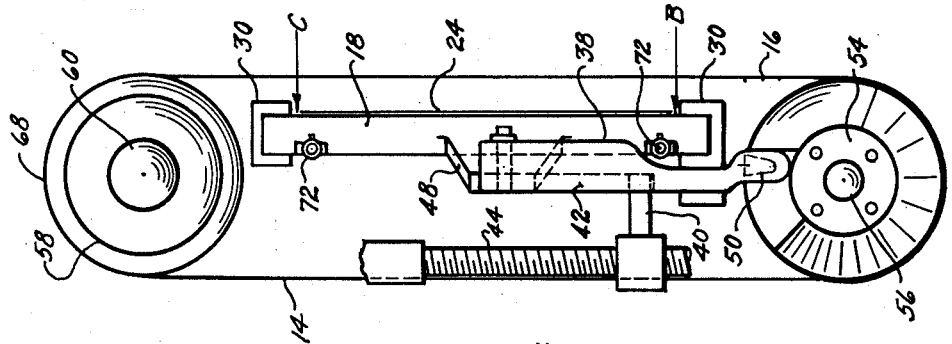
Fig. 4 is a detailed view in side elevation of a preferred embodiment of the present invention.

The present invention is illustrated herein as embodied in an aerial survey camera 10 having a focal plane shutter. As illustrated, the camera 10 is provided with a lens system 12 shown schematically in Fig. 2. The camera 10 is provided with an endless shutter curtain 14 having therein a suitable spaced exposure slit 16 which extends across the focal plane of the camera parallel to the direction of image movement thereon. The camera is provided with a film supporting platen 18 having a surface 20 located substantially in the focal plane of the camera 10. The camera is provided with a supply roll 28 for a strip of photosensitive film 24 which passes under guide rollers 26 between which the platen is located. A portion of the film 24 during exposure is held against the surface 20 of the platen 18 by suction applied to the film 24 through suitable interconnected holes and passages formed in the platen 18. These interconnected passages and openings are not shown herein but it is evident that they are intended to be connected to a suitable vacuum pump. Camera 10 is provided with a suitable intermittently operated take-up roll 22 which may be manually or automatically operated by suitable and well-known means which it is not necessary to describe herein since such means forms no part of the present invention.

The platen 18 is supported in ways 30 fixed to the camera 10 to permit the reciprocation of platen 18 axially to the direction of flight as will be described later. The focal plane shutter 14, as above stated, is in the form of an endless belt having the spaced exposure slit 16 therein. The shutter 14 is formed of any suitable flexible light-impervious material and the photosensitive film 24 is exposed upon movement of the slit 16 across the focal plane of the camera, thus exposing successive portions of the film from one lateral edge of the format or the exposed portion to the other. The shutter 14 is mounted on upper and lower rollers 32, 34 and is connected to cables 36 interconnecting the rollers 32, 34 for positively driving the focal plane shutter 14.

Figure 5:
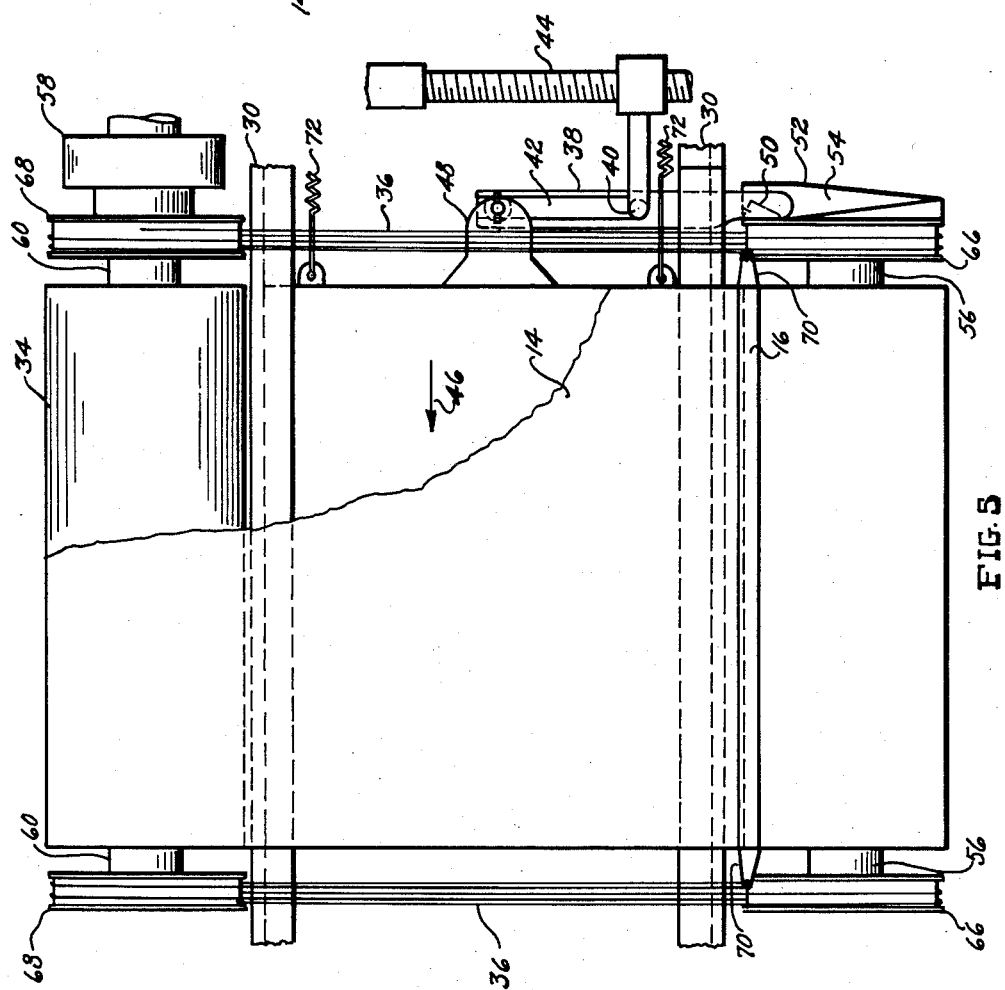
Fig. 5 is a plan view of the construction shown in Fig. 4.

One arrangement for reciprocating the platen 18 is shown in Figs. 4 and 5. The platen 18 is reciprocated by a lever 38 pivoted on an adjustable fulcrum 40. The fulcrum 40 is adjustable along the slot 42 which is formed in the lever 38. The position of the fulcrum 40 is controlled by an adjusting screw 44 to compensate for variations in the rate of image travel resulting from changes in altitude and aircraft speed. Since the rate of differential film transport movement which is necessary to compensate for differential travel throughout the film exposure is a straight line function, a conventional differential gear set may be connected to the screw 44 for adjusting the position of the adjustable fulcrum 40 so that the length of the arms of the lever 38 are proportional to the speed and altitude of the survey aircraft. To accomplish this result, one control actuating shaft of the differential gear set is set for the altitude of the aircraft while the other shaft is set for the ground speed of the aircraft. The result taken off of the differential element is a compound adjustment for positioning the fulcrum 40 for changes in both altitude and aircraft speed.

The platen 18 is arranged to be moved in the direction of the arrow 46 in Figs. 2 and 5 by the lever 38 which is pivotally secured at one end to an extension or arm 48 secured to or formed as a part of platen 18. In order to obtain proper platen acceleration, the other end of the lever 38 is provided with a cam roll 50 which engages a cam surface 52 on a rotary cam 54. The cam 54 is fixed to one end of the shaft 56 on which the roll 32, carrying the focal plane shutter, is mounted. The shaft 56 is rotated from a suitable source of power through a clutch 58 which is fixed to shaft 60 and on which the second shutter-carrying roll 34 is mounted. The rolls 32, 34 carry the focal plane shutter 14 and are connected by the cords 36 which are wrapped about flanged pulleys 66, 68 fixed to the shafts 56 and 60, respectively. The focal plane shutter 14 is fixed to said cords 36 by suitable fasteners 70. Thus, the rolls 32, 34, the cam 54 and the focal plane shutter 14 are operated as a unit.

It may be well at this point to review briefly the operation of the device before discussing the calculations necessary to provide for the image movement compensation. When the clutch 58 (Fig. 5) is engaged, the focal plane shutter 14 is wound up on the lower roller 32 at a predetermined uniform rate to advance the exposure slit 16 across the platen 18. At the same time, the cam 54 is rotated and the lever 38 is rocked to shift or move the platen 18 in the direction of the arrow 46 at a non-uniform rate. The cam surface 52 is in the form of a helix and produces an accelerated motion of the platen 18 during the uniform motion of the exposure slit 16 across the platen 18 so as to maintain that portion of the film 24, which is being exposed by the slit 16, equal to the rate of image movement in that particular part of the film 24 so that there is minimum relative movement between the image and the portion of the film being exposed. Starting at the bottom at A' in Fig. 1, the images of objects near the horizon are traveling more slowly across the focal plane and, therefore, the movement of the platen or film transport 18 in the direction of the arrow 46 is slower across that particular portion of the film 24. As the slit 16 moves upwardly toward C' to the opposite end of the exposed portion of the film 24 to expose ground objects more nearly directly under the camera 10, the rate of movement of the platen 18 increases until the slit 16 reaches the upper edge of the format area. The contour of the cam surface 52 is shaped to accelerate the transport movement of the platen 18 at a predetermined rate as the exposure slit 16 sweeps across the film 24 to compensate for this differential in image travel. Since the rate of acceleration to compensate for these variations in image travel across the focal plane is a substantially straight line function, the contour of the cam surface 52 is relatively simple in form. After the picture is exposed the drive mechanism is reversed, there being a capping shutter (not shown) suitably interconnected, and the focal plane aperture 16 is returned to its initial position. The platen 18 is returned to its initial position by a spring 72. During this return movement of platen 18, the film 24 is released from the platen 18 and the next successive unexposed portion of the film 24 is moved into exposing position on the platen 18 and is then held in position thereagainst by the previously referred to vacuum means.

The camera described above provides a simple and convenient construction which will insure maximum sharpness and clearness over the entire exposed area of a photosensitive film.

In classical cameras when the photographic axis of the camera is substantially vertical, the variation in rate of image movement across the focal plane of the camera for a given speed and altitude is hardly perceptible but when the photographic axis is at an acute angle to the vertical, the variation in rate of movement of the image is sufficiently great to cause a great variation in sharpness and clearness from one edge of the format area to the other. The basic equation for image motion compensation for a camera mounted in a vertical installation is as follows:

$$Vi = \frac{22}{15} \times \frac{VgF}{H}$$

when $Vi$ = Image motion compensation expressed in inches/second
$Vg$ = True ground speed expressed in miles/hour
$F$ = Focal length of lens expressed in inches
$H$ = Altitude above terrain expressed in feet
$\frac{22}{15}$ = Constant for converting the above units into inches and seconds In the above equation H can also be considered the straight line distance from the object being photographed to the front node of the camera lens, if F is considered the straight line distance from the rear node of the lens from the image on the format area or focal plane of the camera. The format area in a vertical installation is substantially parallel to the ground and under such conditions the ratio of F to H is a constant for a given altitude and not normally of concern. This condition, however, is not true when the focal plane is oblique to the general horizontal plane of the ground. It is necessary, therefore, to determine image motion compensation for a camera having its focal plane at an oblique angle to the general plane of the ground being photographed.

Referring now to Fig. 1 of the drawing which illustrates schematically a typical camera installation for aerial survey, the rate of image movement at any point along the focal plane A'B'C' may be determined by the formula:

$$Vi = \frac{22}{15} \times \frac{VgF}{H} \frac{\cos(\alpha+\beta)}{\cos \beta}$$

where $\beta$ is equal to the angle from the optical axis normal to the line of flight of the aircraft.

The value obtained by the equation as set forth above determines the image motion compensation of an object normal to the aircraft in the line of flight and since it can be proven that the ratio of $F \cos(\alpha+\beta)$ to $H \cos \beta$ is a constant, the formula can be used to compute the image motion compensation at any point on the format area. The resulting curve is linear and the platen must be constantly accelerated from the beginning to the end of the exposure. Thus, by obtaining values for $Vi$ over a number of points between the point near the horizon to points more nearly below the aircraft, the slope of the cam surface 52 may readily be determined and thus for a given angle of inclination of the focal plane in a plane substantially normal to the direction of flight, the slope or shape of the cam surface 52 may be laid out to determine the acceleration of the platen 18 regardless of speed and altitude of the photographic airplane. As previously stated, image compensation for speed and altitude of the survey plane may be provided through a mechanism such as the differential gear set hereinbefore referred to.

As previously stated, one of the important points in the present construction is that the curve is linear and that the platen must undergo a constant acceleration from the beginning to the end of the exposure to produce a sharp image. Since the curve is linear, the resulting mechanism is simple and, for a given angle of installation, the same cam may be used regardless of the altitude and speed of the airplane, and compensation for speed and altitude may be provided through a simple differential gear set referred to. The cam 54 is designed to be readily detached in order that different cams having different rates of increase of pitch may be installed to accommodate fixed installation angles of the camera. As a result sharp images are produced over the entire extent of an exposed film and changes necessary to accommodate variations in installation angles and airplane altitude and speed may be quickly and accurately accomplished.

Thus, by utilizing a camera at an angle to a plane through the longitudinal axis of an aircraft, where the camera has a slit oriented parallel to the longitudinal axis of the aircraft and arranged to travel normal to said axis and where the camera has a film platen in the resultant tilted focal plane of the camera with photosensitive film secured thereto during the scan or movement of the said slit, the platen and film thereon may be arranged in accordance with the embodiment presented to be moved parallel to the longitudinal axis of the aircraft at a rate equal to the rate of image travel of the terrain to be photographed on the focal plane of the camera. Since the angular mounting of the camera produces apparent variations in the ground speed at different slit positions, the rate of platen and film movement is varied according to the position of the slit to compensate for the apparent change of rate of image travel.

Having thus described my invention what I claim as new and desire to secure by Letters Patent of the United States is:

1. In an aerial survey camera having its focal plane inclined at an angle to the horizontal, a focal plane shutter having an exposure slit therein extending parallel to the direction of flight of the survey plane and arranged for movement in a direction perpendicular to said slit, means for supporting a film having a photosensitive surface in the focal plane of said camera, means for advancing the film support in the direction of flight at a rate of travel coincident with a rate of image travel during exposure, said means including a lever having an adjustable fulcrum arranged to vary the length of the arms of said lever in proportion to the speed and altitude of the survey plane, and means for varying the rate of travel of said film support at a predetermined rate as the exposure slit sweeps across the film on the film support.

2. In an aerial survey camera having its focal plane inclined at an angle to the horizontal, a focal plane shutter having an exposure slit therein extending parallel to the direction of flight of the survey plane and arranged for movement in a direction perpendicular to said slit, means for supporting a film having a photosensitive surface in the focal plane of said camera, means for advancing the film support at a rate of travel coincident with a rate of image travel during exposure, said means including a cam-operated lever having an adjustable fulcrum arranged to vary the length of the arms of said lever in proportion to the speed and altitude of the survey plane, and a cam associated with said shutter for controlling said fulcrum for varying the rate of travel of said film support in accordance with the rate of image travel as the exposure slit sweeps across the film on the film support.

3. In an aerial survey camera having its focal plane inclined at an angle to the horizontal, a focal plane shutter having an exposure slit therein extending parallel to the direction of flight of the survey plane and arranged for movement in a direction perpendicular to said slit, means for supporting a film having a photosensitive surface in the focal plane of said camera, means for advancing the film support in the direction of flight at a rate of travel coincident with a rate of image travel during exposure, said means including a cam-operated lever having an adjustable fulcrum arranged to vary the length of the arms of said lever in proportion to the speed and altitude of the survey plane, and cam means operated in unison with said shutter for varying the rate of travel of said film support in accordance with the variation in rate of image travel as the exposure slit sweeps across the film on the film support.

4. An aerial survey camera adapted to be mounted in a survey aircraft with the focal plane of said camera disposed at an angle to the general plane of the terrain below, having in combination, a member arranged to support a sheet having a photosensitive surface disposed in the focal plane of the camera, exposure means having an exposure slit therein arranged for movement across said focal plane in a direction at right angles to the direction of flight, and means controlled by the movement of said exposure means to vary the rate of movement of said member with the sheet thereon in the direction of image movement as said exposure slit moves across said focal plane.

5. An aerial survey camera adapted to be mounted in a survey aircraft with the focal plane of said camera disposed at an angle to the general plane of the terrain below, having in combination, a movable platen arranged to support a sheet having a photosensitive surface disposed in the focal plane of the camera, a curtain shutter having an exposure slit therein arranged for movement across said focal plane in a direction at right angles to the direction of flight, and means controlled by the movement of said curtain shutter to vary the rate of movement of said platen with the sheet thereon in the direction of image movement as said exposure slit moves across said focal plane.

6. An aerial survey camera adapted to be mounted in a survey aircraft with the focal plane of said camera disposed at an angle to the general plane of the terrain below having in combination a platen arranged to support a sheet having a photosensitive surface disposed in the focal plane of the camera, exposure means including a curtain having an exposure slit therein arranged for movement across said focal plane in a direction at right angles to the direction of flight, cam and lever means controlled by the movement of said exposure means for varying the rate of movement of said platen with the sheet thereon in the direction of image movement as said exposure slit moves across said focal plane.

7. An aerial survey camera adapted to be mounted in a survey aircraft with the focal plane of said camera disposed at an angle to the general plane of the terrain below having in combination, a lens system, a movable platen having a surface located in the focal plane of said camera and arranged to support a sheet having a photosensitive surface thereon, a focal plane shutter disposed adjacent to said photosensitive surface and having an exposure slit therein arranged for movement across said focal plane at right angles to the direction of flight of the survey aircraft, means engaging said shutter for moving said shutter across said focal plane at a predetermined uniform rate of movement, and a lever controlled by said last mentioned means for varying the rate of movement of said platen with the photosensitive sheet thereon in the direction of image movement as said exposure slit moves across said focal plane.

8. An aerial survey camera adapted to be mounted in a survey aircraft with the focal plane of said camera disposed at an angle to the general plane of the terrain below having in combination, a movable platen having a surface disposed substantially in the focal plane of the camera and arranged to have releasably secured to said surface a sheet having a photosensitive coating thereon, a curtain type shutter adjacent to said photosensitive sheet and having an exposure slit therein, means for moving said shutter to cause said slit to move across said focal plane at a predetermined uniform rate of movement in a direction at right angles to the direction of flight of the survey aircraft, cam means operated by said shutter moving means, and lever connections between said cam means and said platen for moving said platen in the direction of image movement across said focal plane at the varying rates of movement determined by said cam means.

9. An aerial survey camera adapted to be mounted in a survey aircraft with the focal plane of said camera disposed at an angle to the general plane of the terrain below having in combination, a film-supporting platen having a surface located substantially in the focal plane of the camera, a focal plane shutter having an exposure slit therein, rolls on which said shutter is mounted for movement in a direction at right angles to the line of flight of the survey aircraft, means connected to said rolls and arranged to move said exposure slit across said focal plane at a predetermined uniform rate of movement, cam means fixed to one of said rolls and having a cam surface thereon arranged to move said platen at a rate of movement to compensate for the varying rate of movement of said image across said focal plane, and a lever having an end portion engaging said cam surface and the other end portion connected to said platen for moving said platen at varying rates of movement determined by the contour of said cam surface, said lever having arms of lengths proportional to the speed and altitude of the survey aircraft.

References Cited in the file of this patent

UNITED STATES PATENTS

| 2,362,813 | Gorey et al. | Nov. 14, 1944 |
| 2,796,009 | Doyle et al. | June 18, 1957 |

FOREIGN PATENTS

| 516,821 | Germany | Jan. 28, 1931 |
| 514,432 | Belgium | Oct. 15, 1952 |